United States Patent
Gao et al.

(10) Patent No.: US 9,749,021 B2
(45) Date of Patent: Aug. 29, 2017

(54) METHOD AND APPARATUS FOR MITIGATING FEEDBACK IN A DIGITAL RADIO RECEIVER

(71) Applicant: MOTOROLA SOLUTIONS, INC, Schaumburg, IL (US)

(72) Inventors: Yi Gao, Sichuan (CN); Lu-Ming Chen, Sichuan (CN); William M Kushner, Arlington Heights, IL (US); Yu Liu, Sichuan (CN); Li Xiao, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/653,776

(22) PCT Filed: Dec. 18, 2012

(86) PCT No.: PCT/CN2012/086873
§ 371 (c)(1),
(2) Date: Jun. 18, 2015

(87) PCT Pub. No.: WO2014/094242
PCT Pub. Date: Jun. 26, 2014

(65) Prior Publication Data
US 2015/0372723 A1 Dec. 24, 2015

(51) Int. Cl.
*H04B 7/015* (2006.01)
*G10L 21/0208* (2013.01)
(Continued)

(52) U.S. Cl.
CPC .......... *H04B 7/015* (2013.01); *G10L 21/0208* (2013.01); *G10L 21/0232* (2013.01); *G10L 2021/02082* (2013.01); *H04M 9/082* (2013.01)

(58) Field of Classification Search
CPC ............ G10L 21/0208; G10L 21/0232; G10L 2021/02082; H04B 7/015; H04M 9/082
(Continued)

(56) References Cited

U.S. PATENT DOCUMENTS

| 4,091,236 A | 5/1978 | Chen |
| 4,449,237 A | 5/1984 | Stepp et al. |

(Continued)

FOREIGN PATENT DOCUMENTS

| CN | 101917658 A | 12/2010 |
| CN | 102185991 A | 9/2011 |

(Continued)

OTHER PUBLICATIONS

PCT International Search Report Dated Oct. 3, 2013 for Counterpart Application PCT/US2012/086873.

*Primary Examiner* — Houshang Safaipour
*Assistant Examiner* — Bharatkumar S Shah
(74) *Attorney, Agent, or Firm* — Barbara R. Doutre; Scott M. Garrett (57) ABSTRACT

Embodiments of an acoustic feedback suppressor determine the energy in each of a plurality of frequency bands of frames of an audio signal. The energy in each of the plurality of frequency bands is compared to characteristic of human voice to determine that a present frame contains content that is not likely human voice and exhibits a characteristic of feedback. Upon determining that feedback is occurring, an adaptive gain reduction is applied to the band in which feedback is suspected to be occurring.

27 Claims, 7 Drawing Sheets

(51) Int. Cl.
*G10L 21/0232* (2013.01)
*H04M 9/08* (2006.01)

(58) Field of Classification Search
USPC ........................................................ 704/205
See application file for complete search history.

(56) References Cited

U.S. PATENT DOCUMENTS

| | | | |
|---|---|---|---|
| 5,260,980 A * | 11/1993 | Akagiri | H03M 7/3053 |
| | | | 375/241 |
| 5,396,561 A | 3/1995 | Popovich et al. | |
| 5,677,987 A | 10/1997 | Seki et al. | |
| 6,252,969 B1 | 6/2001 | Ando | |
| 6,798,754 B1 | 9/2004 | Farhang Boroujeny | |
| 6,990,194 B2 | 1/2006 | Mikesell et al. | |
| 7,227,959 B2 | 6/2007 | Abraham | |
| 7,231,036 B2 | 6/2007 | Akie | |
| 7,302,070 B2 | 11/2007 | Blamey et al. | |
| 7,664,275 B2 | 2/2010 | Osmanovic et al. | |
| 7,742,608 B2 | 6/2010 | Truong et al. | |
| 7,778,426 B2 | 8/2010 | McDermott et al. | |
| 7,796,767 B2 | 9/2010 | Ura et al. | |
| 7,840,014 B2 | 11/2010 | Asakawa | |
| 7,912,230 B2 | 3/2011 | Kawamura et al. | |
| 8,045,738 B2 | 10/2011 | Sira | |
| 8,144,895 B2 | 3/2012 | Ura | |
| 8,218,788 B2 | 7/2012 | Okumura et al. | |
| 2005/0094827 A1 * | 5/2005 | McDermott | H04R 25/453 |
| | | | 381/98 |
| 2006/0115094 A1 | 6/2006 | Abe | |
| 2009/0080674 A1 * | 3/2009 | Ura | H04R 3/02 |
| | | | 381/94.1 |
| 2009/0125301 A1 | 5/2009 | Master et al. | |
| 2009/0201983 A1 * | 8/2009 | Jasiuk | G10L 21/038 |
| | | | 375/240 |
| 2010/0002891 A1 | 1/2010 | Shiraishi et al. | |
| 2010/0128911 A1 | 5/2010 | Elmedyb et al. | |

FOREIGN PATENT DOCUMENTS

| | | |
|---|---|---|
| CN | 102196109 A | 9/2011 |
| CN | 102223456 A | 10/2011 |
| EP | 765066 A3 | 4/2002 |
| EP | 843502 B1 | 10/2007 |
| EP | 2456232 A1 | 5/2012 |

* cited by examiner

METHOD AND APPARATUS FOR MITIGATING FEEDBACK IN A DIGITAL RADIO RECEIVER

This application is a National Stage filing under 35 USC §371 of co-pending Patent Cooperation Treaty international application having Serial No. PCT/CN2012/086873 (the 'PCT international application') filed on Dec. 18, 2012. This application claims priority to the PCT international application, the entire contents of which are incorporated herein by reference.

FIELD OF THE DISCLOSURE

The present disclosure relates generally to mitigating feedback, and more particularly to detecting the onset of acoustic-sourced feedback in a digital radio receiver and applying suppressive filtering to mitigate and reduce the feedback.

BACKGROUND

Feedback in audio systems is caused by the output signal coupling to an input through an acoustic path, creating a regenerative signal in the loop that results in an undesirable sound. It occurs in all types of systems, from simple public address systems to sophisticated wireless radio communication systems. The conventional ways of dealing with feedback sound include several approaches. One approach is physically separating the input (e.g. microphone) and the output (e.g. speaker) sufficiently to prevent the regenerative signal from occurring. Of course, this is not always possible. Another approach is to simply apply a notch filter at the feedback frequency. This approach is only effective if the feedback occurs at a known frequency, or if the frequency is determined and then a corresponding filter applied, and if the filter doesn't unduly affect the frequency content of desired signals. However, in more complex systems there can be various types of feedback occurring at different frequencies, with different characteristics. Pre-emptively inserting filters to address all forms of feedback would not be practical. Since feedback is regenerative, another approach that is often used is to vary the pitch of audio signals to prevent the regenerative effect from occurring. Pitch can either be shifted to avoid a known resonance frequency or frequency band, or the fundamental pitch of a sound can be determined and varied above and below the fundamental pitch. Pitch shifting is effective, but can often be detected by a listener and is thus not an optimum solution. Other methods include simply detecting a strong tone-like signal in the audio spectrum of the signal through the system and responding by lowering volume, or applying a notch filter at the feedback frequency. This, however, presumes feedback is occurring, which means that listeners are hearing feedback by the time the system detects and applies a measure to address the feedback.

All of the conventional methods are effective, but have their drawbacks. They either require identifying feedback as it occurs, meaning it is being heard by the time it is detected, or requires foreknowledge as to the frequency so that a selected filter can be applied.

Accordingly, there is a need for a method and apparatus for suppressing feedback in an audio system that operates faster than conventional methods and in an adaptive manner to address different kinds of feedback.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
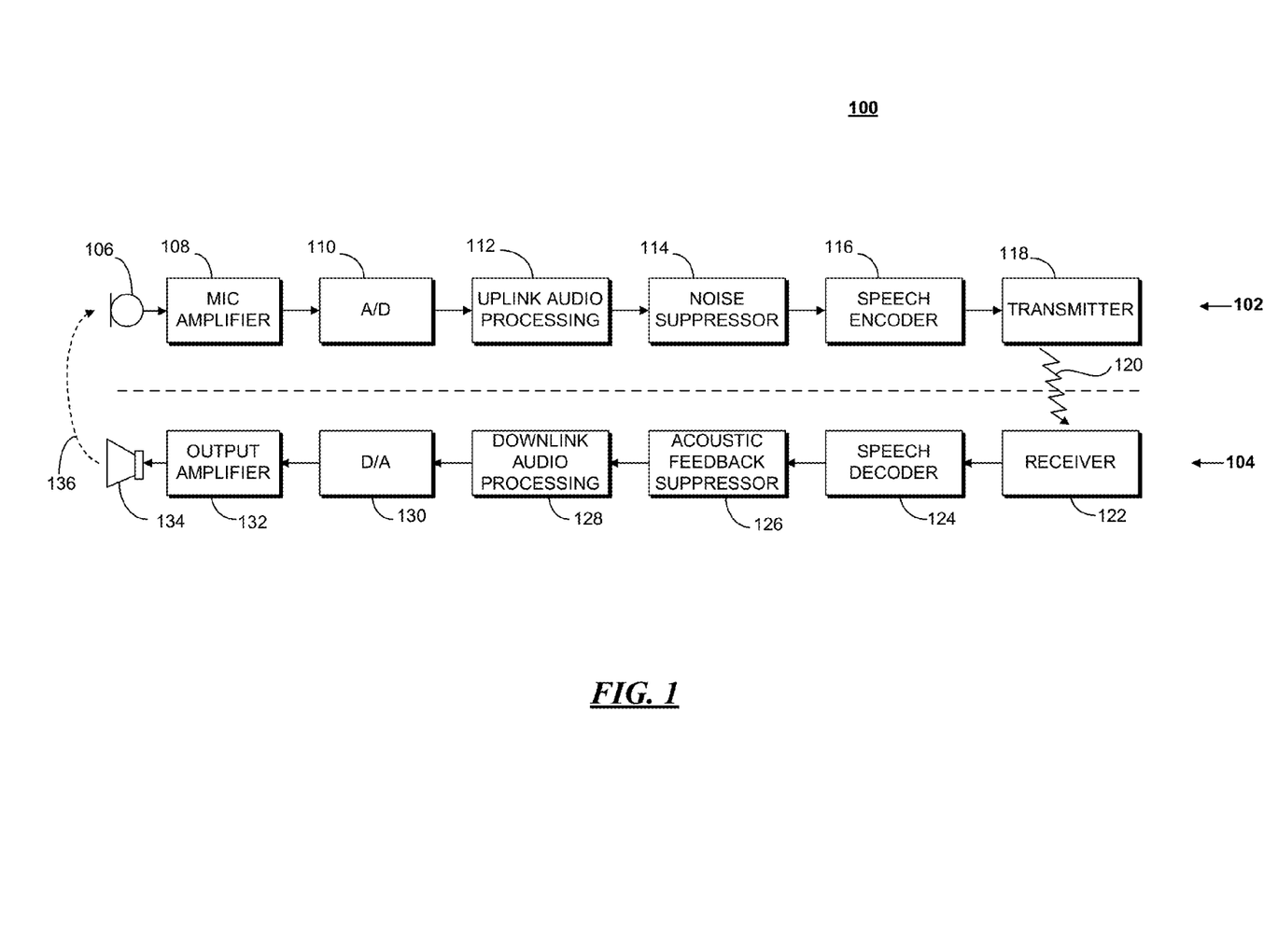
FIG. 1 is a block diagram of a transmitting device and receiving device in accordance with some embodiments.

Embodiments include a method for mitigating feedback in a radio receiver that includes various processes and steps, such as receiving, at the radio receiver, a radio signal and generating a digital audio signal from the radio signal. The digital audio signal is formatted into a series of frames. The method further includes determining an energy level in each of a plurality of frequency bands of the digital audio signal and calculating at least one ratio of a signal energy level of a first frequency band of the plurality of frequency bands to a signal energy level of a second frequency band of the plurality of frequency bands. The method further includes determining that the at least one ratio exceeds a threshold and determining, based at least in part upon determining that the at least one ratio is not consistent with a voice signal, that feedback is occurring in one of the plurality of frequency bands, and applying a gain reduction to the frequency band in which feedback is occurring.

applying a gain reduction to the frequency band in which feedback is occurring. FIG. 1 is a block diagram 100 of a transmitting device 102 and receiving device 104 in accordance with some embodiments. The transmitting device 102 and the receiving device 104 are both two-way radio devices such as those commonly used by public safety and other such personnel. A two-way radio operates in a half-duplex mode; the user can either speak (transmit) or listen (receive) but not both at the same time (e.g. full duplex). Two-way radios can communicate directly with each other, without using a network, and can also be trunked which uses a networked infrastructure, repeaters, and other equipment. The transmitting device 102 shows only the transmitter line up, while the receiving device 104 only shows the receiver line up. Both devices, however, will contain both the transmitter and receiver components shown here for transmitting device 102, and receiving device 104.

In the transmitting device 102, a microphone 106 receives acoustic sound signals which are converted by the microphone 106 into an electrical analog signal that is amplified by the microphone amplifier 110. The amplified analog signal is then digitized by an analog to digital converter 110. An uplink audio processor block 112 formats the digital signal produced by the analog to digital converter 110 for transmitting, such as by grouping digital samples into frames which are then processed to reduce the noise in the samples by a noise suppressor block 114. The processed audio samples output from the noise suppressor 114 are then speech encoded by a speech encoder 116. The speech encoder 116 models speech into a set of parameters, as is done, for example, using vector sum excited linear predictive (VSELP) or advanced multi-band excitation (AMBE) modeling. The encoded speech signal produced by the speech encoder 116 is provided to a transmitter 118 that modulates and transmits the signal over a radio channel 120. The radio channel 120 can be a direct channel between the transmitting device 102 and the receiving device 104 or it can be through a network, repeater, or other such equipment that relays the signal from the transmitting device 102 to the receiving device 104.

The receiving device 104 receives the data over the radio channel 120 at a receiver 122. The receiver 122 contains a demodulator that demodulates the received signal to obtain the speech encoded signal that was transmitted by the transmitting device 102. The receiver 122 provides the received encoded signal to a speech decoder 124 that applies a speech decoding process to the signal provided by the receiver 122. The speech decoder 124 essentially reverses the encoding performed by speech encoder 116 to produce a digital audio signal. The digital audio signal can be organized in frames of audio samples which are processed by an acoustic feedback suppressor 126. The acoustic feedback suppressor 126 processes the received audio samples to detect signals that do not have the typical characteristics of speech, and which appear likely to be the onset of a regenerative signal component. The acoustic feedback suppressor 126 determines the energy of the audio signal in various frequency bands and can apply various tests to determine if the audio signal has energy content that is distributed in the frequency spectrum of the audio signal in a way that resembles speech, both in an instant and over time. When the audio signal energy distribution with respect to frequency is distributed such that is it unlikely to be speech, or when, over time, the energy distribution fails to behave like speech, the acoustic feedback suppressor 126 will reduce the gain in one or more frequency bands. As the signal continues to be received, the gain reduction continues to be applied over time, until the non-speech energy is sufficiently diminished. If the audio signal appears to be speech, though, the acoustic feedback suppressor 126 does not modify the signal.

The output of the acoustic feedback suppressor 126 is provided to a downlink audio processing block 128 which can include equalizers, adaptive/fixed gain controllers, an intelligibility booster, and local sound generators, such as tone, voice announcement and comfortable noise generators that are used to format the digital audio signal for conversion to analog. The D/A conversion is achieved using a digital to analog converter 130. The digital to analog converter 130 produces an analog audio signal which is amplified to a selected volume level by output amplifier 132. The output amplifier applies the amplified analog audio signal to a speaker 134. The speaker converts the electrical analog audio signal into an acoustic signal so that a nearby listener can hear the acoustic signal. If the receiving device 104 is sufficiently close to the transmitting device 102, the speaker output 136 can be received at the microphone 106 of the transmitting device, which can result in regenerative feedback. The feedback can rapidly increase as the sound loops through the transmitting device 102 and the receiving device 104. However, the acoustic feedback suppressor 126 detects audio energy that indicates the audio signal is not likely speech, or includes energy that is not likely speech, and applies an adaptive gain reduction to frequency bands that appear to be experiencing the onset of regenerative feedback.

It is known that the energy in human voiced speech signals tends to be greatest under 1500 Hz. The fundamental frequency of adult male speech is in the region of 125 Hz, adult female speech has a fundamental frequency around 200 Hz, while child speech varies around 250 Hz to 400 Hz. Above about 1400 Hz, the average energy (over time) for voiced speech decreases at about 6 dB per decade. Unvoiced sounds, like fricatives in consonants, have significant energy at higher frequencies, but are relatively short in duration. Furthermore, the frequency response of audio components commonly used in devices such as two-way radios tends to peak at high frequencies, significantly above those where most of the energy in human speech occurs. Accordingly, in general, audio signals that tend to have higher energy content in higher frequency ranges than in lower frequencies are not consistent with speech, and are likely to be the result of feedback. Furthermore, the peak energy in human speech shifts over time as the speaker speaks and pronounces different sounds and words. Accordingly, if the energy in mid and/or low frequency bands is consistent at the same frequency over a period of time where it would be unlikely to be speech, feedback may be occurring. Knowing the characteristic of typical human speech allows the embodiments taught herein to detect audio signals that do not appear to be speech and which are consistent with feedback. An adaptive gain reduction can then be applied to mitigate whatever feedback may be occurring. As shown here the acoustic noise suppressor 126 is in the receiver path 104 of a radio device, but it will be appreciated by those skilled in the art that it can be equivalently placed in the transmit path 102.

Figure 2:
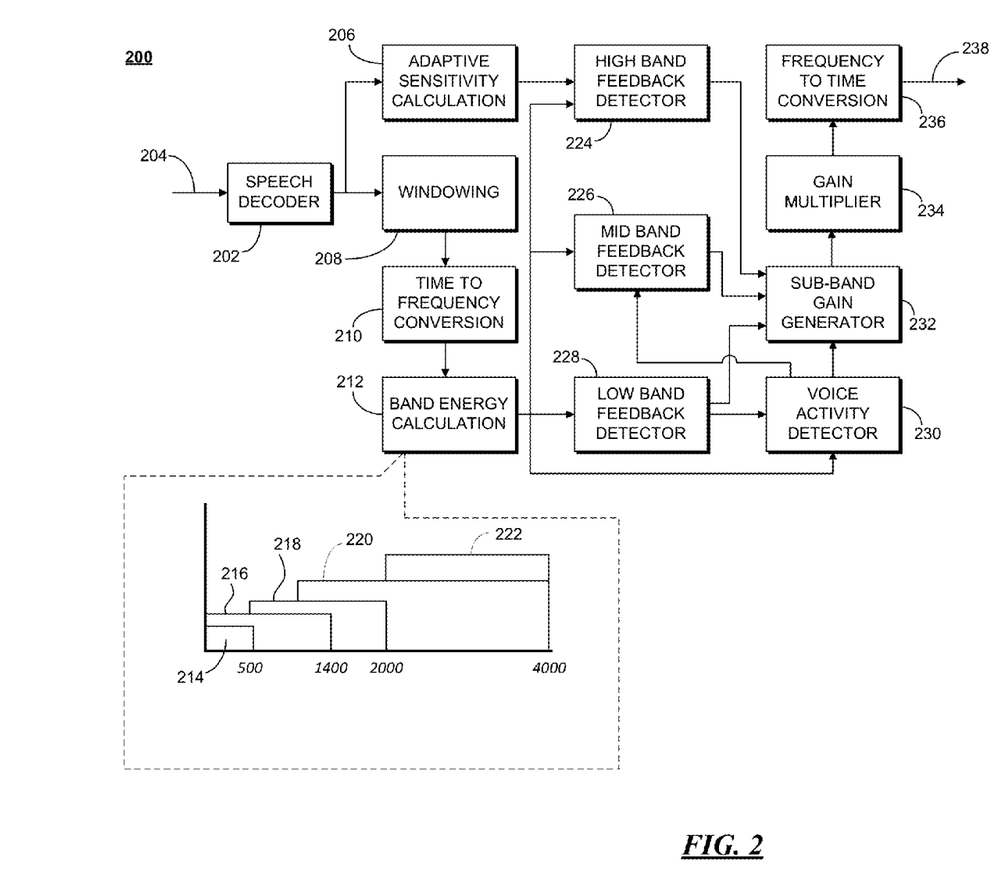
FIG. 2 is a functional block diagram of a feedback suppressor in accordance with some embodiments.

FIG. 2 is a functional block diagram of a feedback suppressor 200 in accordance with some embodiments. The feedback suppressor 200 can be used as the acoustic feedback suppressor 126 of FIG. 1 in some embodiments. The various processes performed by the feedback suppressor 200 are abstracted into boxes in FIG. 2. Each process can be implemented, for example, by a digital signal processor executing appropriate instruction code designed to perform the abstracted processes.

A speech decoder 202 receives encoded speech 204 from a demodulator of a radio receiver (e.g. receiver 122). The speech decoder 202 decodes the speech to produce a digital audio signal that is provided to both an adaptive sensitivity calculation block 206 and a windowing block 208. The adaptive sensitivity calculation block 206 determines the fundamental frequency or pitch of the audio signal, such as by using, for example, an average magnitude difference function. The fundamental frequency is used to dynamically select thresholds for a high band feedback detector 224. The pitch is determined on voiced speech.

The windowing block 208 formats the decoded speech into windows or frames of samples. In some embodiments the windowing block 208 produces frames of 10 millisecond (ms) length, having 80 (eighty) samples of the decoded speech signal having 24 (twenty four) buffer samples before and after the 80 (eighty)samples of the decoded speech to produce 128 point frames with 8 KHz sampling rate. Each frame is processed on a frame by frame basis. The frames are processed by a time to frequency conversion block 210 (e.g. digital Fourier transform) to produce a frequency spectrum for each frame which is provided to a band energy calculation block 212. The band energy calculation block 212 determines the energy in each of a plurality of defined frequency bands. For example, the frequency bands can be defined as a very low band 214 that goes from the lowest frequency (e.g. 0 Hz) of the receiver to 500 Hz, a low band 216 that goes from the lowest frequency to 1400 Hz, or to a frequency in a range such as 1000 to 1400 Hz. The frequency bands can further include a mid band 218 from 500 Hz to 2000 Hz, a high band 220 from 1400 Hz to the highest frequency of the receiver, such as 4000 Hz, and a very high band 222 from 2000 Hz to the highest frequency. The size of the frequency bands 214-222 as shown here are not meant to be proportional to energy content or magnitude, and are arranged here only to show their range and how they can overlap.

For each band 214-222 the band energy calculation block 212 determines the magnitude of the energy contained in the respective band. The band energy calculations are provided to each of several band feedback detector blocks, which include the high band feedback detector block 224, the mid band feedback detector block 226, and the low band feedback detector block 228.

The high band feedback detector 224 uses the output of the adaptive sensitivity calculation 206 to determine appropriate thresholds based on the pitch of voiced speech in the audio signal. Two ratios are determined; the ratio of the energy in the low band 216 to the energy in the high band 220, and the ratio of the energy in the very low band 214 to the energy in the very high band 222. Since the energy in human speech is mostly in the lower frequencies, if these ratios are too low it indicates the audio signal contains unusually high frequency content that is uncharacteristic of speech, and may therefore be feedback in the high bands. The ratio of the energy in the low band 216 to the energy in the high band 220 is compared to a first threshold, and the ratio of the energy in the very low band 214 to the energy in the very high band 222 is compared to a second threshold, where the first and second thresholds are based on the determined pitch.

Figure 3:
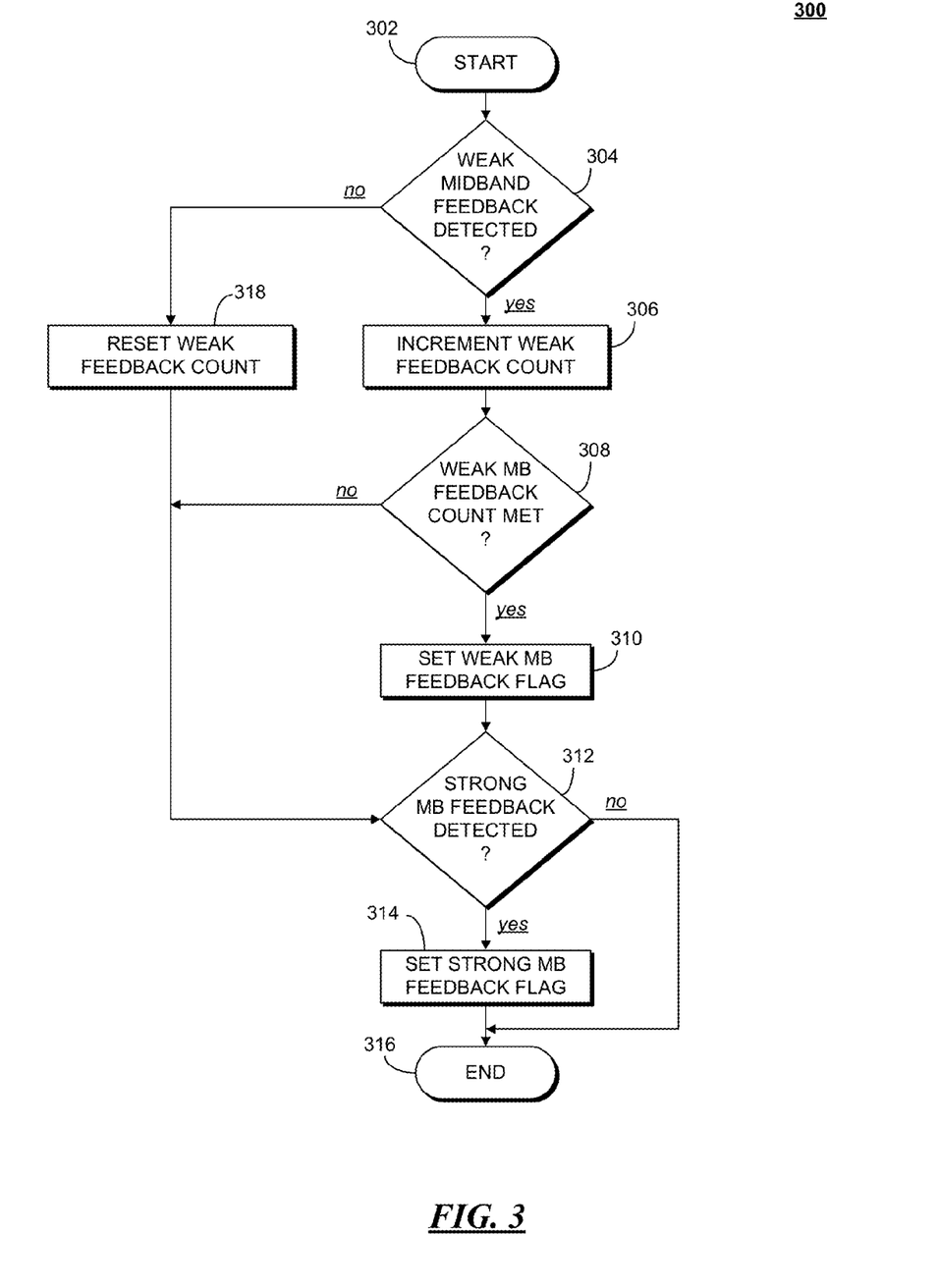
FIG. 3 is a flow chart diagram of a method for detecting feedback in a mid-band frequency region of a signal in accordance with some embodiments.

The mid band feedback detector 226 also determines two energy ratios, the ratio of energy in the mid band 218 to the energy in the very high band 222, and the energy in the mid band 218 to the energy in the very low band 214. The operation of the mid band feedback detector 226 is shown in FIG. 3, which is a flow chart diagram of a method 300 for detecting feedback in a mid-band frequency region of a signal in accordance with some embodiments. At the start 302 the two mid band energy ratios have been calculated for a present frame (mid to very high and mid to very low). The method 300 can determine whether there is weak mid-band feedback occurring, as in process 304, by comparing the mid to very low and mid to very high energy ratios to mid-band weak low threshold and a mid-band weak high threshold, respectively. If the ratios are larger than these thresholds, then weak mid-band feedback may be occurring, and a counter for weak feedback is incremented in process 306. The counter value is then evaluated in process 308. The counter indicates whether the weak mid-band feedback has been occurring for a sufficient period as it is incremented with each successive frame that the mid band ratios fall under their respective thresholds. If the mid band ratios do not fall under their respective thresholds, the counter is reset, as in process 318. If the counter indicates that the preselected number of consecutive frames have elapsed where the mid band ratios fall under their respective thresholds, then a weak mid band flag can be set in process 310. The method 300 also determines if there is strong mid band feedback occurring in process 312. The mid band ratios are compared to mid band strong low and mid band strong high thresholds, which are lower than the mid band weak low and mid band weak strong thresholds, respectively. If the mid band energy ratios fall under the mid band strong thresholds, the strong mid band feedback flag is set in process 314. Once the weak and strong mid band feedback determinations have been made, the method 300 terminates 316.

Figure 4:
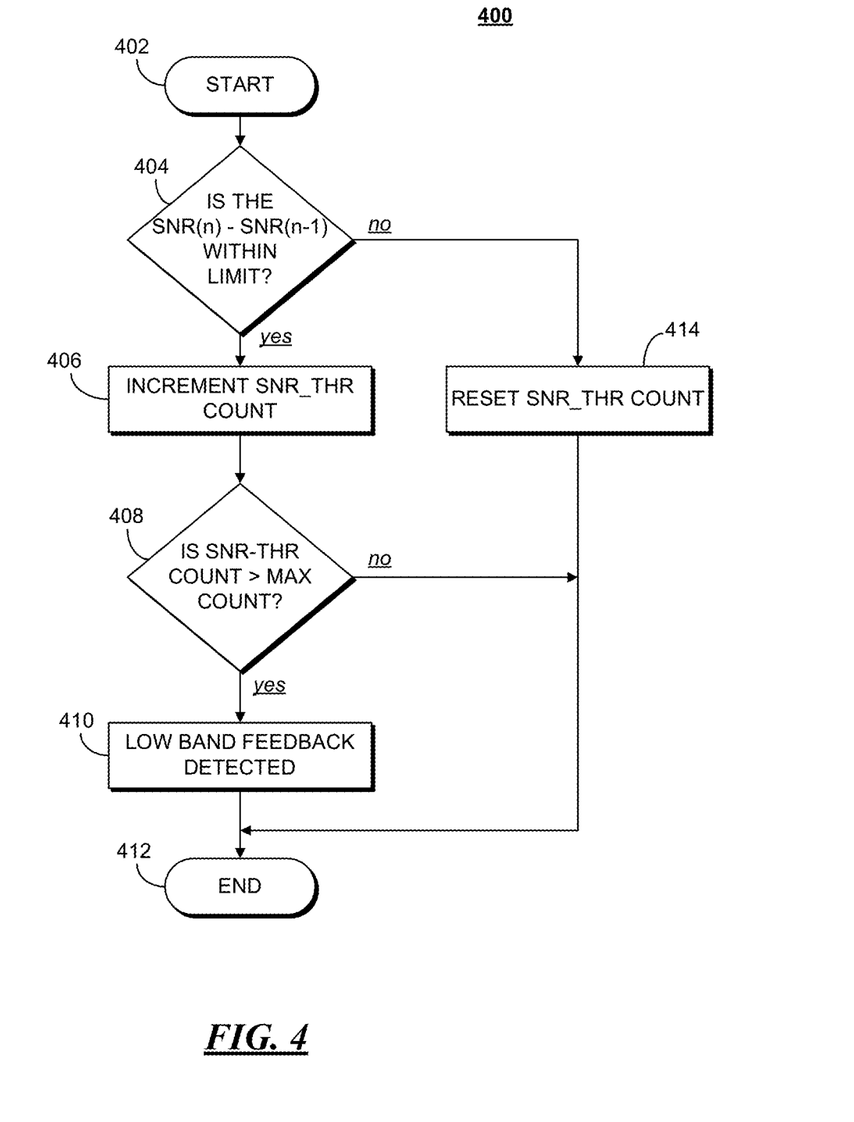
FIG. 4 is a flow chart diagram of a method for detecting feedback in a low-band frequency region of a signal in accordance with some embodiments.

Returning to FIG. 2, the feedback suppressor 200 also includes the low band feedback detection block 228. Low band feedback, which occurs under 500 Hz (the very low band 214), can be difficult to detect because speech tends to have significant energy in the low band region. However, speech also varies with time, so while speech energy is high in the low band, it changes in magnitude over time, unlike feedback which tends to be consistent. Therefore, to detect low band feedback, the energy consistency over time must be examined. A method for performing low band feedback detection is shown in FIG. 4, which shows a flow chart diagram of a method 400 for detecting feedback in a low-band frequency region of a signal in accordance with some embodiments. At the start 402, the low band feedback block 228 has calculated the signal to noise ratio (SNR) in the low band for several consecutive frames. The method 400 then compares the present SNR (SNR(n)) with the SNR of the most recent (or other recent) frame (SNR(n−1)), in process 404. If the difference between the present and recent SNR level is less than a preselected amount (e.g. "yes" out of process 404), then an SNR threshold counter is incremented in process 406, otherwise the SNR threshold counter is reset in process 414. When the SNR threshold counter is incremented, the count value of the SNR threshold counter is evaluated in process 408. If the SNR increment counter meets a preselected value, which corresponds to a time duration which would indicate that the energy in the low band has been consistent, rather than varying as speech would, then low band feedback has been detected, as indicated in process 410, where a flag can be set for further operations. The method then terminates 412 for the present frame. The SNR can be determined by a variety of known means. In some embodiments the SNR can be determined as 10 log(maximum low band energy/minimum low band energy).

Referring again to FIG. 2, once the high, mid, and low band feedback detection processes 224, 226, and 228, respectively, have been performed for the present frame, further processing is performed. A voice activity detector (VAD) block 230 determines whether the present frame contains voice activity. Voice activity can be determined based on the time-smoothed maximum and minimum energies in the very low band 214. If the difference between the maximum energy and the minimum energy in the very low band 214 is greater than a VAD threshold, then a VAD flag can be set, indicating the present frame contains speech, otherwise the flag is cleared indicating there is no speech in the present frame. When there is no speech present and indicated by the VAD 230, then all gain adjustments can be reset to a normalized level.

A sub-band gain generator 232 determines the gain to be applied to the various bands, 214, 218, 222. An overall gain can be determined as the product of the two ratios determined in the high band feedback detector block 224, which are the ratio of the energies of the low band 216 to the high band 220 and the very low band 214 to the very high band 222. The smaller these ratios, the more likely there is feedback occurring. The gain can further be smoothed by taking into account the gain used in the most recent frame along with a smoothing value. This allows for the gain to ramp up, as well, when speech is detected as indicated by the VAD 230. In the gain multiplier block 234, the new gain factors are applied to their respective bands. The gain multiplied frame is then converted back into the time domain in frequency to time conversion block 236 and the output 238 is a signal that has been examined for feedback, and when detected, mitigation measures have been applied to reduce the effect of feedback.

Figure 5:
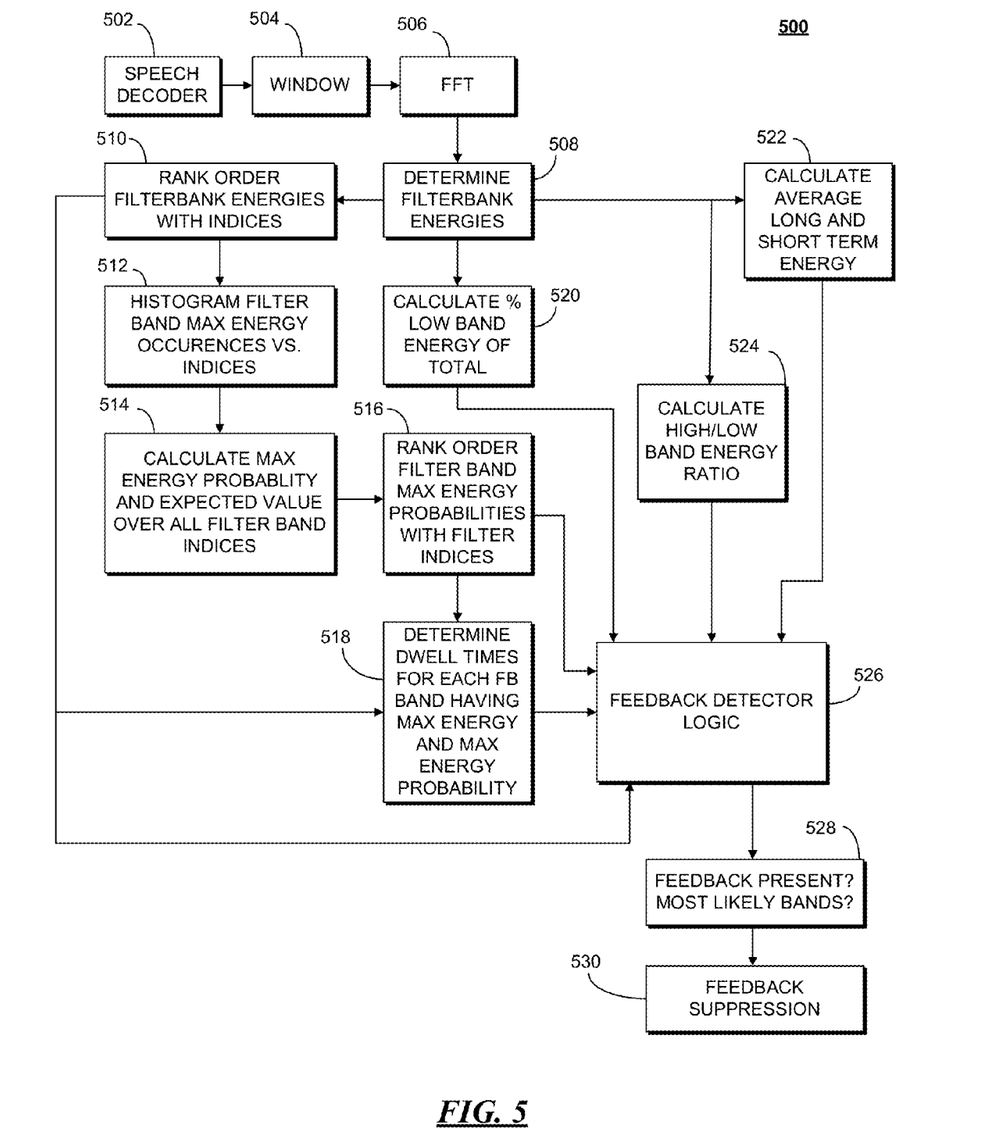
FIG. 5 is a functional block diagram of a feedback suppressor in accordance with some embodiments.

FIG. 5 is a functional block diagram of a feedback detector 500 in accordance with some embodiments. The feedback detector 500 can be used as an additional or alternative processing element in the acoustic feedback suppressor 126 of FIG. 1 in some embodiments. In some embodiments it can be used to supplement and help verify the feedback detection processes performed by the feedback suppressor described in FIGS. 2-4. The speech decoder 502 can operate as the speech decoder 124 of FIG. 1, and decodes received encoded speech to produce a digital audio signal which is windowed 504 to produce a succession of frames. Each frame contains a plurality of time-based samples for consideration, and may be padded with zeros to produce a frame of a pre-determined length. A frequency representation (frequency frame) of each time frame is produced by, for example, a fast Fourier transform block 506. The frequency frame is then processed to determine the energy in each of a plurality of frequency bands or filterbank channels in process 508. In some embodiments the energies can be determined for 16 (sixteen) frequency bands or filterbank channels distributed along a Bark frequency scale, although other frequency scales can be used, as well. Upon determining the filterbank energies, the highest filterbank channel energy is stored (maxFBE) and at least the three channels having the highest energies are ranked (e.g. $1^{st}$, $2^{nd}$, and $3^{rd}$ highest and corresponding indices, e.g. 1 through 16) in process 510. These ranked results are stored in a table, array, or other data structure along with their corresponding channel indices (maxFBEI[i][j], i=1, . . . , 16, j=1 energy, j=2 index) with the lowest index (i=1) corresponding to the channel with the highest energy. Additional, or even all other filterbank energies, can be likewise rank ordered. Furthermore, the average long and short term energies are calculated in process 522. The short term energy is the total energy of the present frame (ASTE), whereas the average long term energy (ALTE) is the average of a number of previous frames over a period of time, such as, for example 1 second.

The filterbank channel energy rankings of process 510 can be used to form a histogram to track the changes in rankings of the filterbank channels over a period of time in process 512. An accumulated count of how often a particular channel contains the maximum energy in a frame is stored in a bin (e.g. one of 16 bins) corresponding to a filterbank channel in the histogram table. The count in each histogram bin is time-weighted so that the histogram represents the filterbank maximum energy occurrence distribution over a limited, moving time window. The length of the time window is nominally between 0.15 and 1.0 seconds, corresponding to the duration of a typical speech syllable. From the histogram a set of probabilities for the maximum energy occurring in each filterbank channel (p[i]), and the expected values (pev[i]) are calculated in process 514 using common statistical procedures. The filterbank channel energy probabilities along with their indices (maxFBEP[i][1,2], i=1, . . . , 16, j=1 probability, j=2 index) are then ranked ordered from highest to lowest so that the channels having the highest probabilities of containing the maximum energy may be easily identified in process 516 with the lowest index (1=1) corresponding to the channel with the highest energy probability. The band(s) containing feedback usually exhibit the highest, second, or third highest energy probabilities. In addition, energy duration can be used as a parameter to detect possible howling because the duration of a feedback event is usually longer than that of a syllabic speech sound, and because its band residency is more stationary. The maximum acoustic energy of speech tends to vary more in time and in frequency than does feedback energy. The fact that feedback generally has a longer duration in a given frequency band or adjacent bands can be used to further discriminate between normal speech and the presence of feedback. Minimum duration limits can be set for detecting a feedback condition where the limits are shorter for higher bands than in lower bands. Usually the highest energy sustained speech sounds are voiced sounds occurring at lower frequencies so longer dwell times must be assigned to differentiate feedback. Accordingly, dwell times for each filterbank band having the maximum energy and maximum energy probability can be determined in process 518. This is accomplished by keeping a count of consecutive frames for each filterbank channel that exhibits the $1^{st}$ $2^{nd}$, or $3^{rd}$ highest probability of having the highest energy, and having the highest energy. If the channel does not meet the criteria the count is reset to zero. These dwell counts are stored in a memory array, maxEcnt[i] and maxPcnt[i] where i is the index of a specific filterbank channel.

In process 520 the percentage of low band energy (elbPRCNT), for example, in one embodiment the band from 80-300 Hz, of the total frame energy is determined, and in process 524 a high to low band energy ratio (hblbRatio), is determined, where the total energy in the higher filterbank channels above 500 Hz is divided by the energy in the channels below 500 Hz. Note that the limits of these frequency bands may be adjusted dependent on the total frequency response of the decoded output speech from FIG. 1 block 124. Different audio pre-filtering lineups and codec responses may alter the overall bandpass at the decoder output, FIG. 1, block 124. The various parameters and ratios are all evaluated by a feedback detector logic block 526. The feedback detector logic consists of a sequence of comparison tests in which the signal-derived parameters maxEcnt[i], maxPcnt[i], maxFBE, ALTE, elbPRCNT, hblbRatio, maxFBEI[i][j], and maxFBEP[i][j] are compared against empirically derived threshold constants. If the logical result of the comparisons is true a howling detection flag (HowlDetFlg) is set to logical 1. If not the flag is set to 0. The output of the feedback detector logic 526 is an indication of whether feedback is occurring, and if so, in what band or bands, which is evaluated in process 528. When feedback is occurring, as indicated, for example, by a flag set by the feedback detector logic 526 to indicate such, the suppression can be applied in process 530 that is adapted to the detected feedback. Generally, a gain reduction factor is determined, and applied to one or more of the filterbank channels (0-15) to modify each frame in the frequency domain. After applying the gain reduction, if any is needed, the frequency frame is converted back into a processed time frame using an inverse Fourier operation, and the processed time frame is then forwarded to, for example, the downlink audio processing block 128 of FIG. 1.

Figure 8:
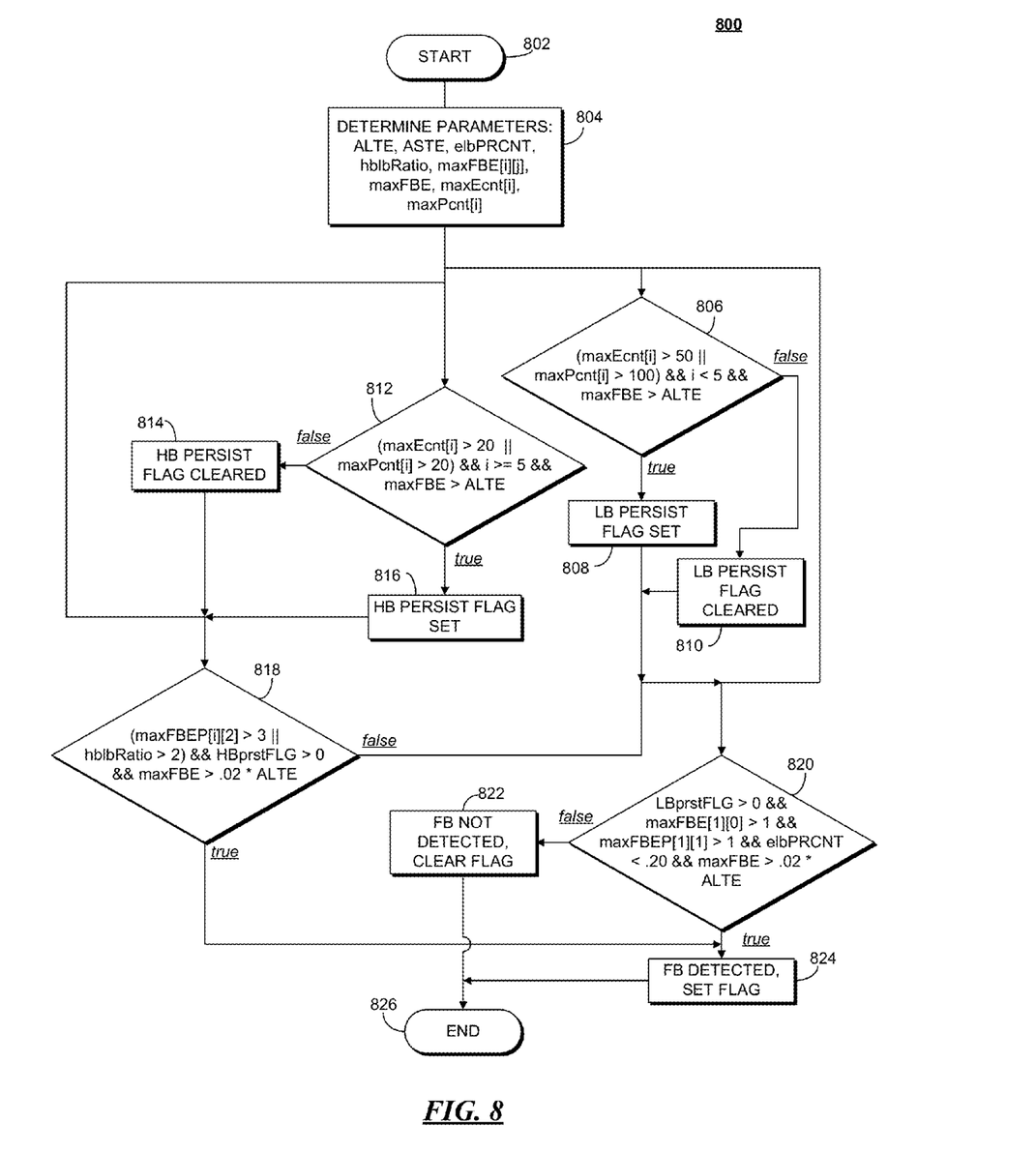
FIG. 8 is a flow chart diagram of a method of performing feedback detection in accordance with some embodiments.

A flowchart of one embodiment of the feedback detector logic in FIG. 5 block 526 is shown in FIG. 8. Note that the threshold parameters shown in FIG. 8 are only representative and different embodiments may use different parameters. The HowlDetFlg feedback present flag and indices of the filterbank channels in which it most likely occurs are made available in process 528. In one embodiment this information is passed on to an embodiment of the feedback suppressor as exemplified in FIG. 2, and in particular blocks 224, 226, and 228 and can be used to supplement or supersede the feedback detection performed in these processes. In another embodiment, the howling detector of FIGS. 5 and 8 may use another means to suppress and attenuate the feedback in specific filterbank channels as in process 530, independent of the methods used in embodiment of the feedback suppressor depicted in FIGS. 2-4.

Figure 6:
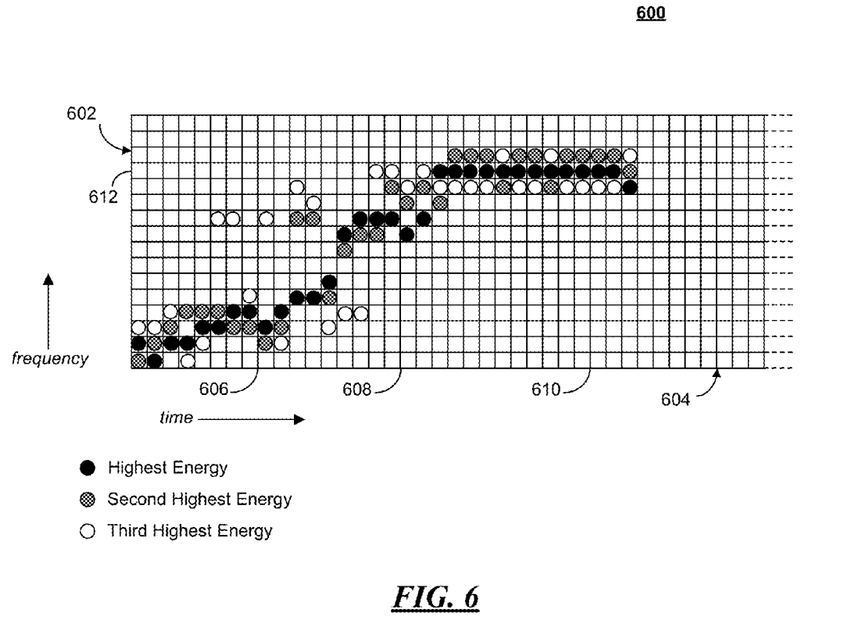
FIG. 6 is a index chart used by a feedback suppressor in accordance with some embodiments.

FIG. 6 is an index chart 600 used by a feedback suppressor in accordance with some embodiments. The chart 600 indexes the frequency bands (rows) or filterbank channels having the highest three energies with frequency increasing along the vertical axis 602. Each column corresponds to a frame of information at regular periods, with time increasing along the horizontal axis 604. The highest energy is denoted with a filled circle, the second highest with a gray circle, and the third highest with an white circle. The chart 600 charts a sound burst that commences as voiced speech and then becomes feedback in the high band. From the origin to period 606 the highest energy bands are concentrated in the lower frequency bands. Between periods 606 and 608, the energy in the low bands diminishes, as would be consistent with a sound that terminates with unvoiced speech, where there is higher energy concentrated in the mid band frequencies. From period 608 to period 610, and thereafter, the energy is concentrated in the higher bands, and the highest energy is persistently in one filterbank channel 612, as is consistent with feedback or howling.

Figure 7:
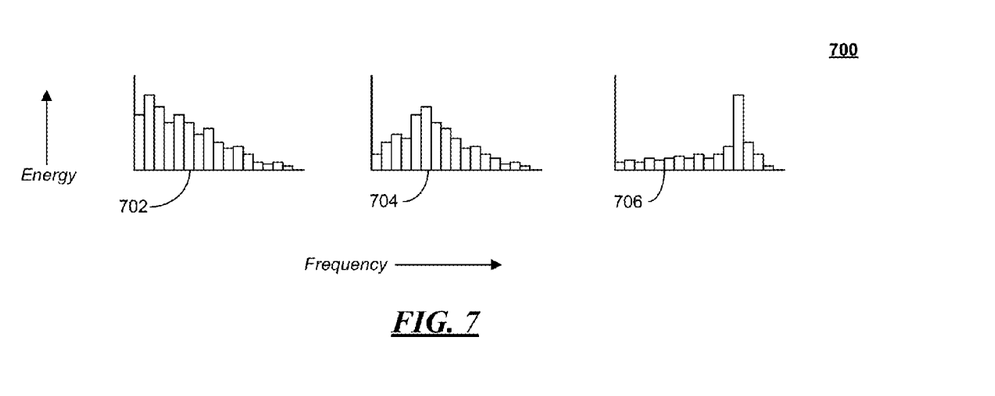
FIG. 7 is a series of energy indexed histograms derived from the index chart of FIG. 6 at several times.

FIG. 7 is a series of energy indexed histograms 700 derived from the index chart of FIG. 6 at several times. Each histogram charts frequency along their horizontal axis, in discrete divisions corresponding to the filterbank channels along the vertical axis of FIG. 6, and a count of ranking over a period of time (e.g. multiple frames), based on the ranking performed by, for example, process 510 in FIG. 5, is charted along the vertical axis. In some embodiments, the histogram can be produced by summing the energy in each filterbank channel of each frame for a period of time. Histogram 702 can represent the energy distribution from the origin to period 606 in FIG. 6. The energy is concentrated in the lower filterbank channels, as is consistent with voiced speech. In histogram 704, the energy is more centrally distributed, as would be consistent, for example, in the time between periods 606 and 608 of FIG. 6. When feedback, such as howling, is occurring, as in the time between periods 608 and 610 of FIG. 6, the energy tends to be concentrated in fewer filter channels as indicated I histogram 706.

FIG. 8 is a flow chart diagram of a method 800 of performing feedback suppression in accordance with some embodiments. The method 800 can operate as the feedback detector logic 526 of FIG. 5. At the start 802, a present frame under consideration has been converted to a frequency frame. Furthermore, there it can be assumed in the present example that the process has been executed for several frames in succession prior to the present frame so that there is a history in the various parameters to be determined. Accordingly, the various parameters are determined, as in process 804, including the percentage of energy in the low band relative to the total energy (elbPRCNT), the average long term energy (ALTE) of the past n consecutive frames, the short term energy of the present frame (ASTE), the ratio of high band energy to low band energy (bhlbRatio), the maximum filter band energy index (maxFBE[i][j]), the maximum filterbank energy (maxFBE), the count of successive frames of a filterbank channel having maximum energy (maxEcnt[i]), and the count of successive frames of a filterbank channel having the highest probability of having the highest energy (maxPcnt[i]).

A high band evaluation is performed in process 812. The evaluation 812 determines whether either maxEcnt[i] or maxPcnt[i] exceed 20 frames (in the present example), whether the index number is 5 or higher (ensuring only the higher frequencies are used in this evaluation), and whether the maximum filterbank energy is greater than the average long term energy. If this evaluation is false, meaning at least one condition is not true, the high band (HB) persistence flag is cleared in process 814. If the high band evaluation is true, meaning all conditions are true, then the high band persistence flag is set (or not cleared if already set) in process 816.

A low band evaluation is performed in process 806. The evaluation 806 determines whether either maxEcnt[i] exceeds 50 successive frames or if maxPcnt[i] exceed 100 successive frames (in the present example), whether the index number is lower than 5 (ensuring only the lower frequencies are used in this evaluation), and whether the maximum filterbank energy is greater than the average long term energy. If this evaluation is false, meaning at least one condition is not true, the low band (LB) persistence flag is cleared in process 810. If the low band evaluation is true, meaning all conditions are true, then the low band persistence flag is set (or not cleared if already set) in process 808.

A high band feedback detection evaluation is performed in process 818, which determines whether the maximum filterbank index probability is greater than 3 (in this example) or whether the high band energy to low band energy ratio is greater than 2, and whether the high band persistence flag is set, and whether the maximum filterbank energy is greater than 2% of the average long term energy. If the high band feedback detection evaluation 818 is true, then the feedback detected flag is set in process 824 and the method can terminate 826. If the high band feedback detection evaluation 818 is false, meaning at least one of the conditions is not true, the feedback detected flag is not set, and the low band feedback detection evaluation 820 is performed.

A low band feedback detection evaluation is performed in process 820, which determines whether the low band persistence flag is set, whether the low band persistence flag is set, whether the energy in the low band is at least 20% of the total frame energy, and whether the maximum filterbank energy is at least 2% of the average long-term energy. If the low band feedback detection evaluation 820 is true, meaning all conditions are true, then the feedback detected flag is set in process 824. If the low band feedback detection evaluation 820 is false, meaning at least one condition is not true, then the feedback detected flag is cleared in process 822 and the method terminates 826.

Once the method 800 terminates 826, if the feedback detected flag is set, then an appropriate gain reduction can be applied to the frequency frame before converting it back to the time domain. Since the feedback detection and gain reduction are applied over successive frames, the frequency bands in which the feedback has been detected will continue to diminish until the feedback conditions are longer evident. Due to the regenerative nature of feedback, the gain reduction propagates through the feedback loop to eliminate the feedback. Once the feedback conditions are no longer met, the gain can be ramped back up to normal levels, or until the feedback conditions are evident again.

Embodiments as exemplified herein have the benefit of quickly identifying feedback, such as howling, but evaluating a received audio signal against characteristics of speech, such as having an unusually high energy in a high band compared to a low band, having low band energy that is both persistent and consistent in form, rather than more variable like speech.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for mitigating feedback in a two-way radio, comprising:
   receiving, an audio signal in a receiver path of the two-way radio;
   mitigating feedback in the receiver path of the two-way radio using a digital signal processor performing the following:
      generating a digital audio signal from the audio signal, the digital audio signal formatted in a series of frames;
      determining an energy level in each of a plurality of frequency bands of the digital audio signal;
      calculating at least one ratio of a signal energy level of a first frequency band of the plurality of frequency bands to a signal energy level of a second frequency band of the plurality of frequency bands;
      determining that the at least one ratio exceeds a threshold; and determining, based at least in part upon determining that the at least one ratio is not consistent with a voice signal, that feedback is occurring in one of the plurality of frequency bands in the receiver path of the receiving two-way radio caused by a transmitting two-way radio; and applying a gain reduction to the frequency band in which feedback is occurring to suppress the feedback.

2. The method of claim 1, wherein determining the energy level in each of the plurality of frequency bands comprises determining the energy level in each of the plurality of frequency bands on a frame by frame basis.

3. The method of claim 1, wherein determining the energy level in each of the plurality of frequency bands comprises smoothing the energy level over time with a smoothing factor.

4. The method of claim 1, further comprising, dynamically setting the threshold based on a present pitch of the audio signal.

5. The method of claim 1, wherein determining the energy level in each of the plurality of frequency bands comprises determining the energy level in two adjacent frequency bands.

6. The method of claim 5, wherein the two adjacent frequency bands are a high and a low band, where the low band begins at a lowest frequency for the receiver, and the high band ends a highest frequency of the receiver and the high and low bands are adjacent at a middle frequency.

7. The method of claim 6, further comprising:
determining an energy level in a very low band that is from the lowest frequency for the receiver to a low middle frequency that is below the middle frequency;
determining an energy level in a very high band that is from a high middle frequency that is above the middle frequency to the highest frequency of the receiver;
determining a ratio of the energy in the very low band to the very high band; and
applying a gain reduction in the high band when the energy in the very low band to the very high band exceeds a very low to very high threshold.

8. The method of claim 7, further comprising:
determining the gain reduction based on the product of the ratio of the energy in the very low band to the very high band and the ratio of the energy in the low band to the energy in the high band.

9. The method of claim 7, further comprising:
determining an energy level in a mid band, where the mid band is from the low middle frequency to the high middle frequency;
determining a ratio of the energy in the middle band to the energy in the very high band;
determining a ratio of the energy in the middle band to the energy in the very low band; and
applying the gain reduction to the mid band when the ratio of the energy in the middle band to the energy in the very high band exceeds a strong mid to high threshold and the ratio of the energy in the middle band to the energy in the very low band exceeds a strong mid to low threshold.

10. The method of claim 9, further comprising:
determining an energy level in a mid band, where the mid band is from the low middle frequency to the high middle frequency;
determining a ratio of the energy in the middle band to the energy in the very high band;
determining a ratio of the energy in the middle band to the energy in the very low band; and
applying the gain reduction to the mid band when the ratio of the energy in the middle band to the energy in the very high band exceeds a weak mid to high threshold and the ratio of the energy in the middle band to the energy in the very low band exceeds a weak mid to low threshold for a preselected number of consecutive frames.

11. The method of claim 1, wherein determining the energy level in each of the plurality of frequency bands of the digital audio signal comprises determining the energy level in each of a plurality of consecutive frequency bands, the plurality of consecutive frequency bands being distributed along a Bark frequency scale.

12. The method of claim 1, wherein determining the energy level in each of a plurality of frequency bands of the digital audio signal comprises determining the energy level in each of plurality of bands, the plurality of frequency bands being distributed along a Bark frequency scale.

13. The method of claim 12, further comprising determining the percentage of energy in a low frequency band of a total energy in a present frame, wherein the low frequency band includes at least one Bark scale band, and wherein determining that the at least one ratio is not consistent with a voice signal further includes determining that the percentage of energy in the low frequency band is below a threshold.

14. The method of claim 12, further comprising:
determining an average long term energy that is an average of total energy in each of a plurality of successive frames;
determining that a present frame energy exceeds the average long term energy.

15. The method of claim 12, further comprising:
generating a filterbank index by indexing a plurality of the Bark scale bands by ranking them in order of energy magnitude;
generating a histogram from the filterbank index based on the energy in each of the indexed Bark scale bands.

16. A two-way radio device, comprising:
a receiver path, comprising:
a signal source that provides a digital audio signal;
a windowing component that formats the digital audio signal into a sequence of frames; and
an acoustic feedback suppressor that determines an energy level in each of a plurality of frequency bands of the digital audio signal, calculates at least one ratio of a signal energy level of a first frequency band of the plurality of frequency bands to a signal energy level of a second frequency band of the plurality of frequency bands, determines that the at least one ratio exceeds a threshold, determines, based at least in part upon determining that the at least one ratio is not consistent with a voice signal, that feedback is occurring in one of the plurality of frequency bands caused by a transmitting two-way radio, and applies a gain reduction to the frequency band in which feedback is occurring to suppress the feedback.

17. The two-way radio of claim 16, wherein the acoustic feedback suppressor further dynamically sets the threshold based on a present pitch of the audio signal.

18. The two-way radio of claim 16, wherein the acoustic feedback suppressor is in the receiver path of the two-way radio.

19. The two-way radio of claim 16, wherein the acoustic feedback suppressor determines the energy level in each of the plurality of frequency bands of the digital audio signal as the energy in each of a plurality of bands of a Bark scale.

20. The two-way radio of claim 16, wherein the acoustic feedback suppressor further determines the percentage of energy in a low frequency band of a total energy in a present frame, wherein the low frequency band includes at least one Bark scale band, and that the percentage of energy in the low frequency band is below a threshold.

21. The method of claim 1, wherein the feedback is regenerative feedback caused by the receiving two-way radio being sufficiently close to the transmitting two-way radio, and a speaker output of the receiving two-way radio is received at a microphone of the transmitting two-way radio.

22. The two-way radio of claim 16, wherein the feedback is regenerative feedback caused by the receiving two-way radio being sufficiently close to the transmitting two-way radio, and a speaker output of the receiving two-way radio is received at a microphone of the transmitting two-way radio.

23. The method of claim 1, wherein the gain reduction is applied by an acoustic feedback suppressor operating in at least one of:

the receiver path of the receiving two-way radio; and a transmit path of the transmitting two-way radio.

24. The method of claim 1, wherein the feedback is acoustic feedback.

25. The two-way radio of claim 16, wherein the feedback is acoustic feedback.

26. The method of claim 1, wherein the first frequency band and the second frequency band of the plurality of frequency bands are sub-bands of the plurality of bands.

27. The two-way radio of claim 16, wherein the first frequency band and the second frequency band of the plurality of frequency bands are sub-bands of the plurality of bands.

* * * * *